June 18, 1935.   H. W. NELSON   2,005,045
RELIEF ATTACHMENT FOR CULTIVATORS
Filed March 6, 1934
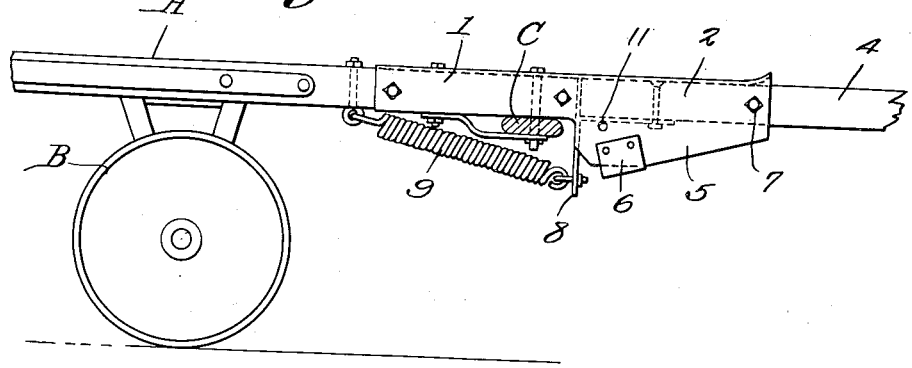
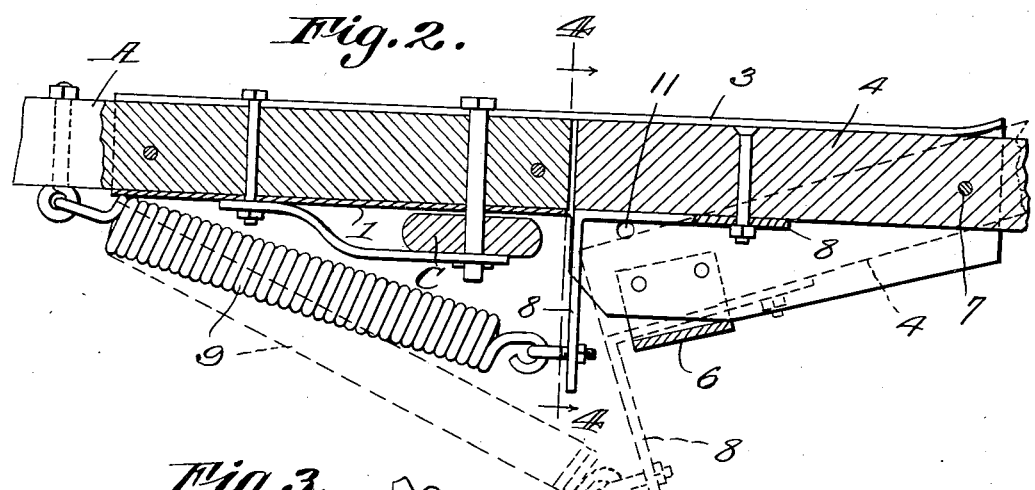
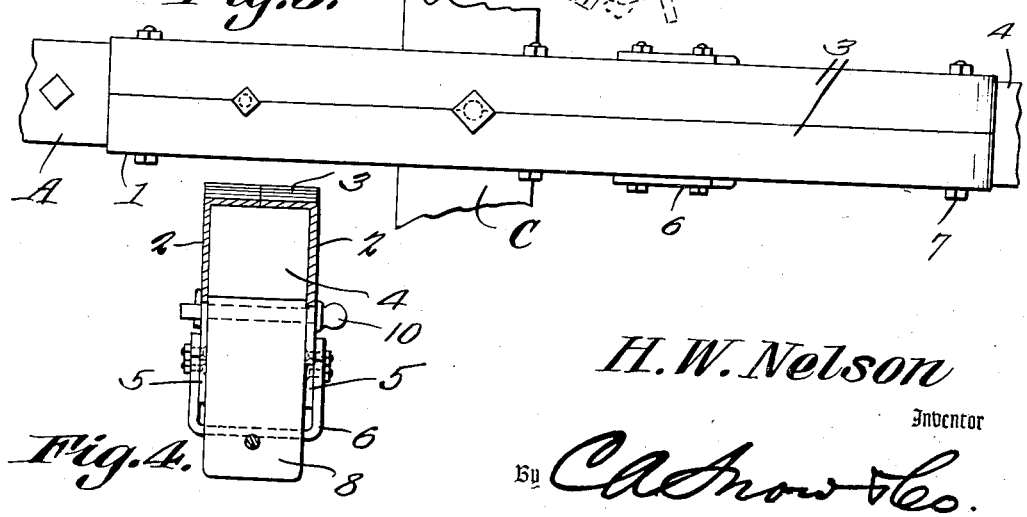
H. W. Nelson
Inventor
By C. A. Snow & Co.
Attorneys.

Patented June 18, 1935

2,005,045

UNITED STATES PATENT OFFICE 2,005,045

RELIEF ATTACHMENT FOR CULTIVATORS

Harry W. Nelson, Brownville, Nebr.

Application March 6, 1934, Serial No. 714,306

4 Claims. (Cl. 97—199)

This invention relates to cultivators and more particularly to means whereby a cultivator can be pulled over a ditch or other depression without danger of forcing the shovels too deeply into the soil and without requiring the use of lifting devices as heretofore employed.

As is well known to those skilled in the cultivation of corn and the like it is frequently necessary to cross depressions such as ditches in the field and in order to do so properly most cultivators have been equipped with lifting levers whereby the shovels can be raised so as to prevent them from entering the soil too deeply while crossing the depression. It frequently happens, however, that an inattentive driver fails to act promptly and, as a result, the shovels will dig into the soil and possibly bring the cultivator to a stop or break some of the parts.

It is an object of the present invention to provide a cultivator or the like with a novel draft means which will break automatically should the cultivator dip into the depression and thereafter draw the dipped end upwardly out of the depression so as to prevent the shovels from entering the soil at too great a depth while leaving the depression.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a side elevation of a portion of the draft means of a cultivator equipped with the present improvements, the whiffletree being shown in section.

Figure 2 is an enlarged vertical longitudinal section through the parts shown in Figure 1, one of the extreme positions of the forward section of the beam being indicated by broken lines.

Figure 3 is a plan view of the structure shown in Figure 2.

Figure 4 is a section on line 4—4, Figure 2.

Referring to the figures by characters of reference A designates the cultivator tongue which is mounted as usual upon a tongue truck B which is located in front of the cultivator shovels (not shown).

Secured to the forward end of the tongue A is an elongated sleeve 1 having its sides 2 and top 3 extended forwardly beyond the end of the tongue for straddling the back end portion of a draft tongue 4. The sides 2 have downwardly extending portions 5 constituting guide flanges and these are connected near their back ends by a cross strip 6 fastened thereto and constituting a stop.

Draft tongue 4 is fulcrumed between the forward ends of the sides 2 as shown at 7 and its back end is normally positioned close to the front end of tongue A. An angular bracket 8 is secured to the bottom of the tongue 4 and extended downwardly from its back end and the lower end of this bracket is connected by a coiled spring 9 to tongue A as shown. Thus tongue 4 is held normally in alinement with tongue A.

A whiffletree C can be connected to the tongue A in the usual manner.

As before stated the tongues A and 4 normally aline. The forward extension of sleeve 1 prevents tongue 4 from swinging laterally relative to tongue A while spring 9 and bracket 8 serve to hold the back end of the tongue 4 pressed upwardly against the top 3. While the parts thus located a cultivator can be pulled forwardly in the usual manner. When a ditch is to be crossed the truck B ordinarily would be lifted off of the ground and carried across the ditch and as a result the weight of the operator and of the machine is transferred to the rear shovels and the front end of the tongue or the neck yoke to which the tongue is attached. Because of this the cultivator shovels would move downwardly into the ditch and plow into the ditch bottom. Such an operation is not desirable for the reasons heretofore stated. For the purpose of overcoming this objectionable result the break joint has been provided between the tongues A and 4. Consequently when a ditch is reached the tongue 4 will shift downwardly as indicated by broken lines in Figure 2, at the same time placing spring 9 under increased tension. Thus tongue A will dip downwardly and allow the truck B to roll down into the ditch and thence upwardly therefrom, the wheels being maintained constantly in contact with the ground. Therefore all danger of dropping the cultivator shovels into the ditch and forcing them abruptly into the bottom of the ditch, is eliminated. Spring 10 will obviously restore the tongues to their normal relative positions after the ditch has been passed.

It is essential that the tongue 4 be held positively against lateral swinging movement relative to tongue A as otherwise it would not be possible to properly steer the cultivator. For that reason the sleeve 1 has been provided with a box-like extension formed by the parts 2, 3, 5 and 6. With this arrangement the two tongues are maintained in alinement under normal conditions which is a very desirable feature because any other location of the tongues relative to each other would change the line of draft and throw the cultivator shovels out of their proper operative positions.

Importance is attached to the fact that this structure can be applied readily to cultivators already in use and without requiring any rearrangement of the parts.

Should it be desired to prevent relative swinging movement of the tongues A and 4, a pin 10 could be inserted through openings 11 in the sides of the extension 2. This pin has been shown in position in Figure 4.

What is claimed is:

1. The combination with the tongue of a cultivator or the like having a tongue truck, of a box-like extension projecting forwardly from said tongue, a draft tongue fulcrumed within and projecting forwardly from the extension, said extension being proportioned to permit downward movement of that end of the draft tongue within the extension, and a spring connecting the tongues for resisting said movement and holding them normally in alinement.

2. The combination with the tongue of a cultivator or the like having a tongue truck, of a box-like extension projecting forwardly from said tongue, a draft tongue fulcrumed within and projecting forwardly from the extension, said extension being proportioned to permit downward movement of that end of the draft tongue within the extension, a depending member rigidly connected to the draft tongue within the extension, and a spring connecting said member to the cultivator tongue for resisting said movement of the tongue and for holding the tongues normally in alinement.

3. The combination with a cultivator tongue and a tongue truck joined thereto, of a sleeve secured to the tongue, a box-like extension thereon, a draft tongue fulcrumed in the extension and held thereby against lateral swinging relative to the cultivator tongue, a depending member carried by the draft tongue, a spring connecting said depending member to the cultivator tongue for yieldingly maintaining one end portion of the draft tongue against the top of the box-like extension with both tongues in alinement.

4. The combination with a cultivator tongue and a tongue truck joined thereto, of a sleeve secured to the tongue, a box-like extension thereon, a draft tongue fulcrumed in the extension and held thereby against lateral swinging relative to the cultivator tongue, a depending member carried by the draft tongue, a spring connecting said depending member to the cultivator tongue for yieldingly maintaining one end portion of the draft tongue against the top of the box-like extension with both tongues in alinement, and a stop carried by the extension for limiting the movement of the draft tongue against the action of its spring.

HARRY W. NELSON.